United States Patent [19]
Eschwey et al.

[11] Patent Number: 4,755,201
[45] Date of Patent: Jul. 5, 1988

[54] PROCESS FOR REMOVING LIGHTER VOLATILE IMPURITIES FROM GASES

[75] Inventors: Manfred Eschwey, Dusseldorf; Werner Schleser, Duisburg, both of Fed. Rep. of Germany

[73] Assignee: Messer. Griesheim GmbH, Fed. Rep. of Germany

[21] Appl. No.: 853,234

[22] Filed: Apr. 17, 1986

[30] Foreign Application Priority Data

Sep. 25, 1985 [DE] Fed. Rep. of Germany ....... 3518283

[51] Int. Cl.$^4$ ............................................. F25J 5/00
[52] U.S. Cl. ...................................... 62/12; 62/55.5; 55/269
[58] Field of Search ...................... 62/55.5, 12; 55/269

[56] References Cited

U.S. PATENT DOCUMENTS

| | | | |
|---|---|---|---|
| 3,364,654 | 1/1968 | Westbrock | 62/55.5 |
| 3,585,807 | 6/1971 | Hengevoss et al. | 62/55.5 |
| 3,721,101 | 3/1973 | Sheppard et al. | 62/55.5 |
| 4,191,022 | 3/1980 | Williams | 62/55.5 |
| 4,479,927 | 10/1984 | Gelernt | 62/55.5 |
| 4,506,513 | 3/1985 | Max | 62/55.5 |

*Primary Examiner*—Ronald C. Capossela
*Attorney, Agent, or Firm*—Connolly & Hutz

[57] ABSTRACT

Lighter volative impurities are removed from gases by drawing the gas to be purified into a vacuum system. The gas to be purified deposits onto the cold surface of a condenser which is at cryogenic temperatures, while the lighter volatile impurities are continuously pulled out of the vacuum system in gaseous form.

7 Claims, 1 Drawing Sheet

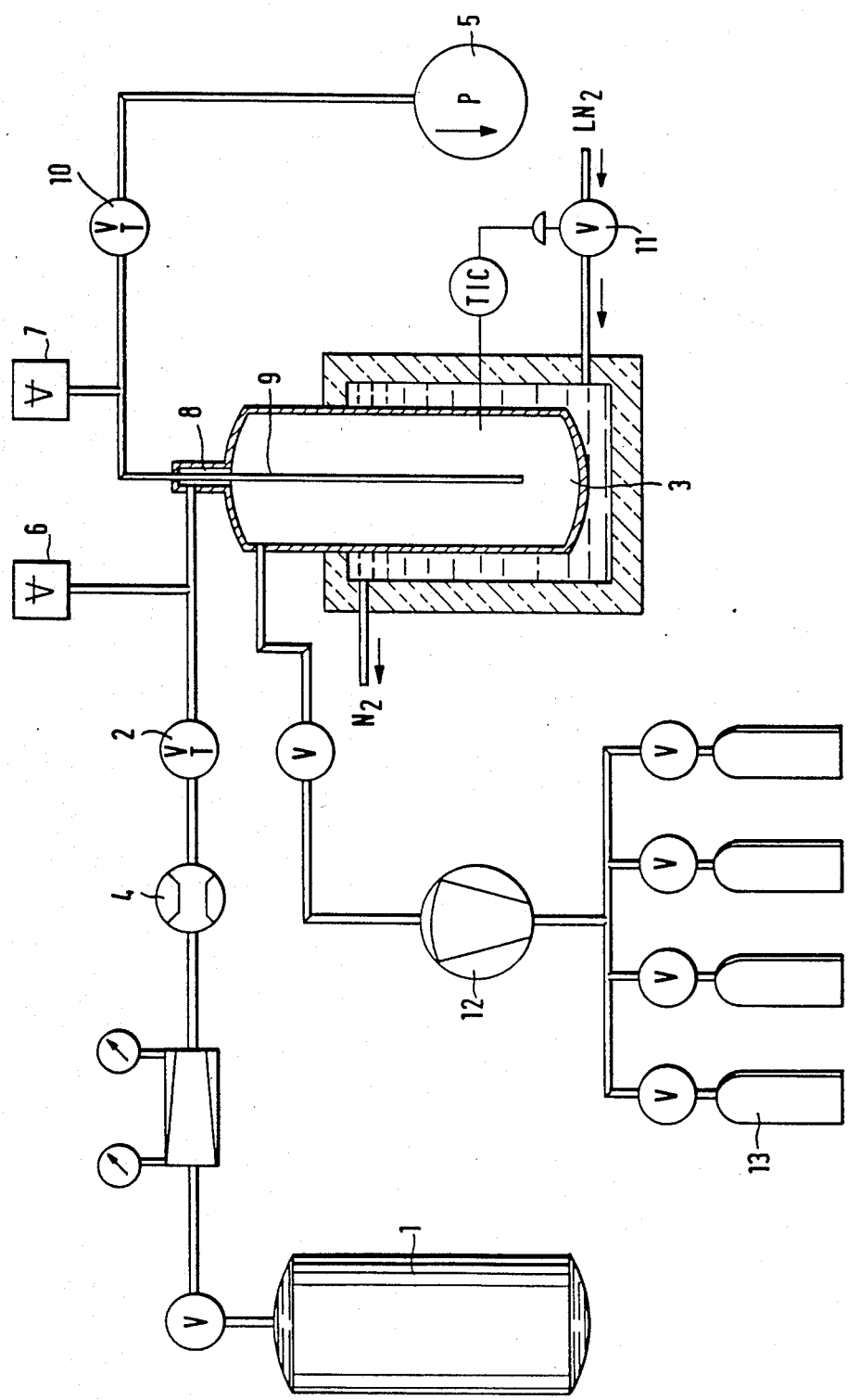

PROCESS FOR REMOVING LIGHTER VOLATILE IMPURITIES FROM GASES

BACKGROUND OF THE INVENTION

Operational conventional purification processes such as distillation, rectification and adsorption can be economically carried out only with large amounts of gas. If one uses such purification processes with small amounts of gas and if one sets extremely high requirements for purity, the purified product gases become unusually expensive. This is the case with the production and purification of doping gases for the semi-conductor industry. These conditions are even more complex when the gases to be purified are highly toxic, self igniting or unstable.

Examples of such gases are silane, disilane, dichlorosilane, germane, borane, arsine, hydrogen chloride, ammonia, tetrafluoromethane and various metallic organic compounds. Among the contaminating components are: nitrogen, oxygen, inert gases, hydrocarbons, carbon dioxide and carbon monoxide. These impurities are, as a rule, more easily volatilized than the gases to be purified.

SUMMARY OF THE INVENTION

The object of this invention is to achieve a simple economical process with which the more easily volatilized impurities are removed efficiently in a single step to a level below the limit of detection even from small amounts of gas to be purified.

A prerequisite for the high efficiency of the inventive process is working with a dynamic vacuum. In other words, the non-condensed lighter volatile impurities are continuously pulled out of the vacuum system so that they have no opportunity for redissolving, at least partially in the condensed out gas to be purified. A gas transfer vacuum pump is preferably used for the production of the dynamic vacuum. An additional condition for the efficacy of the process according to the invention is that the vapor pressure curves of the gas to be purified and the impurities to be removed be far apart. This is the case with hydrogen and atmospheric gases, the main contaminants, but there are exceptions, namely the separation of carbon dioxide from hydrogen chloride. In the event that the impurity is less volatile than the gas to be purified, other purification processes must be used. One would then logically combine the invention's process with conventional purification and separation processes when there are impurities present which cannot be removed or which can only be removed to a small degree. This then results in multi-step processes but always efficiently and simply operating purification processes.

The principle of the inventive process is used in cooling applications as are, for example, known from DE-DO 25 20 941. Such cooling applications, however, are exclusively for the improvement and maintenance of a vacuum and not for the purification of gases.

The practical tests on the inventive process have shown that it permits a surprisingly effective separation of impurities from condensable substances, especially at the trace level.

With the thin layer condensation process according to the invention in a dynamic vacuum, it is a matter of a typical irreversible process, namely the escape of a gas into a vacuum system. The system is therefore in a state of thermal imbalance. As a result of the continuous removal of the impurities, that is, as a result of the formation of a dynamic vacuum, a stable, stationary state is obtained. This stationary condition of continuously flowing system differs fundamentally from the introduction of a near thermal equilibrium as is necessary for obtaining advantageous separation or purification effects with known thermal separation processes in vacuum as, for example, rectification or fractional condensation.

THE DRAWING

The single FIGURE illustrates an embodiment of the invention in schematic form.

DETAILED DESCRIPTION

The gas to be purified is drawn from a storage vessel 1 and released, via a flow meter 4 and a throttle valve 2, into a vacuum system which consists of a condenser 3 and a gas transfer pump 5. As far as condensers go, any designs developed according to the special conditions of vacuum technology can be used. The median temperature in the condenser 3 is kept at a temperature suitable to the separation problem, preferably $-100°$ C. to $-200°$ C., by a regulated cooling with liquid nitrogen by means of the regulating device 11. The components to be purified are condensed out at the cold surface of the condenser 3, that is, as a rule, in the form of a thin frozen out layer. The lighter volatile impurities are simultaneously suctioned via the ascending pipe 9 by the gas transfer vacuum pump 5. The ascending pipe 9 forms, together with the inlet to the condenser, an annular recess 8 through which the gas to be purified arrives in the condenser 3 from the storage vessel 1. The pressure meters 6 and 7 serve to control the vacuum, whereas a throttle valve 10 serves to adjust the suction line of the gas transfer vacuum pump 5. After the end of the process, the purified gas is channeled into pressure vessels 13 by means of a compressor 12 or by uncondensation. Two embodiments are described below.

EXAMPLE 1 purification of monosilane

While the gas transfer vacuum pump 5 is running, monosilane is allowed to flow, via the annular recess 8, into the condenser 3 which has a volume of 10 l. which has been evacuated to $10^{-3}$ mbar. The median temperature at the cold surface of the condenser 3 is adjusted by liquid nitrogen to $-150°$ C. to $-196°$ C. by means of the regulating device 11. A constant flow of between 100 and 1,000 $lh^{-1}$, under normal conditions, is set at the flow meter 4 and throttle valve 2. The pressure at the inlet of the condenser 3 can amount to 100 to 600 mbar while at the outlet of the condenser, a pressure of between 10 and $10^{-2}$ is set. The suction line of the gas transfer vacuum pump 5 is adjusted to between 5 and 15 $m^3 h^{-1}$, by means of the throttle valve 10, according to the amount of gas to be pumped off. The mentioned preferred ranges for several process parameters are essentially dependent upon the device. Aside from this, the selection and/or setting of the process parameters are naturally influenced to a large degree by the strongly varying proportions of components which do not condense easily.

The purification analysis of the monosilane is performed by gas chromatography with the aid of a highly sensitive heat conductivity detector. As controls, analyses by means of a coupling of gas chromatograph and mass spectrometer are carried out. Both analytical processes yielded, practically, the following confirming values:

| Analysis of introduced silane | | Analysis of purified product |
|---|---|---|
| $H_2$ | 338 vpm | <10 vpm |
| $N_2$ | 8D vpm | <1 vpm |
| $Ar + O_2$ | 20.5 vpm | <1 vpm |
| $CH_4$ | 20 vpm | <1 vpm |

EXAMPLE 2

Purification of hydrogen chloride. The complete prior removal of the contaminants water and carbon dioxide is decisive for the success of the purification of hydrogen chloride. The presence of water would result in the formation of hydrochloric acid and carbon dioxide is less volatile than hydrogen chloride. The most important process parameters and analytical results for this are mentioned:

| | |
|---|---|
| Amount of HCl flowing into the condenser: | 400 to 1,200 $l\ h^{-1}$ |
| Pressure at condenser inlet: | 200 to 800 mbar |
| Pressure at condenser outlet: | 0,8 to 0.01 mbar |
| Temperature of the condenser: | −130 to −196° C. |

| Analysis of introduced silane | | Analysis of purified product |
|---|---|---|
| $H_2$ | 214 vpm | <10 vpm |
| $Ar + O_2$ | 23 vpm | <1 vpm |
| $N_2$ | 166 vpm | <1 vpm |

SUMMARY

In order to obtain highly purified gases, the impurities can be removed by various purification processes, for example, distillation or rectification. But these processes are uneconomical when used for small amounts of gas to be purified as for example, for doping gases for the semiconductor industry. In order to be able to economically purify such small amounts of gas one carries out the separation of the impurities in a dynamic vacuum at the cold surface of a condenser 3. The gas to be purified condenses onto this cold surface while the lighter volatile impurities are continuously pulled off by means of a gas transfer vacuum pump 5.

What is claimed is:

1. In a process for removing lighter volatile impurities from gases in order to obtain the gases in highly purified form, the improvement being in continuously feeding the gas to be purified into a condenser by means of a gas transfer pump communicating with the condenser, cooling a surface of the condenser at cryogenic temperatures between −100° C. and −200° C. on a cold surface of the condenser to which the gas is exposed, condensing the gas by means of the gas contacting the cold surface to form a deposit from the gas to be purified with the lighter volatile impurities remaining in gaseous form, and continuously withdrawing the lighter volatile impurities in gaseous form from the condenser.

2. Process according to claim 1, characterized therein that at the end of the process the purified gas is removed from the condenser.

3. Process according to claim 1, characterized therein that lighter volatile components are drawn off by means of a gas transfer vacuum pump.

4. Process according to claim 3, characterized therein that the cold surface of the condenser is held at temperatures between −100° C. and −200° C. by liquid nitrogen using a regulated cooling apparatus.

5. Process according to claim 4, characterized therein that the gas to be purified is a gas from the group of silane, disilane, dichlorosilane, germane, borane, arsine, hydrogen chloride, ammonia and tetrafluoromethane while the impurities to be removed consist of one or more gases from the group of hydrogen, nitrogen, oxygen, inert gases, hydrocarbons, carbon dioxide and carbon monoxide.

6. Process according to claim 1, characterized therein that the cold surface of the condenser is held at temperatures between −100° C. and −200° C. by liquid nitrogen using a regulated cooling apparatus.

7. Process according to claim 1, characterized therein that the gas to be purified is a gas from the group of silane, disilane, dichlorosilane, germane, borane, arsine, hydrogen chloride, ammonia and tetrafluoromethane while the impurities to be removed consist of one or more gases from the group of hydrogen, nitrogen, oxygen, inert gases, hydrocarbons, carbon dioxide and carbon monoxide.

* * * * *